(12) United States Patent
Yamada et al.

(10) Patent No.: US 8,808,926 B2
(45) Date of Patent: Aug. 19, 2014

(54) ELECTRODE ACTIVE MATERIAL FOR ALL-SOLID-STATE SECONDARY BATTERY AND ALL-SOLID-STATE SECONDARY BATTERY USING THE SAME

(75) Inventors: Kazuhiro Yamada, Nagaokakyo (JP); Masanori Endo, Nagaokakyo (JP)

(73) Assignee: Murata Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 13/557,541

(22) Filed: Jul. 25, 2012

(65) Prior Publication Data

US 2013/0004858 A1 Jan. 3, 2013

Related U.S. Application Data

(63) Continuation of application No. PCT/JP2011/050346, filed on Jan. 12, 2011.

(30) Foreign Application Priority Data

Jan. 28, 2010 (JP) ................... 2010-016622

(51) Int. Cl.
*H01M 6/18* (2006.01)
*H01M 10/0562* (2010.01)
*H01M 4/88* (2006.01)

(52) U.S. Cl.
USPC .................. 429/322; 429/304; 252/182.1

(58) Field of Classification Search
CPC ..... H01M 4/02; H01M 6/18; H01M 10/0562; H01M 4/88
USPC ........ 204/294; 423/350; 429/322, 231.8, 304; 252/182.1
See application file for complete search history.

(56) References Cited

U.S. PATENT DOCUMENTS

2003/0190523 A1 * 10/2003 Omaru et al. ............... 429/199

FOREIGN PATENT DOCUMENTS

| JP | 2001273928 A | * 10/2001 | ............ H01M 10/40 |
| JP | 2003-068361 A | 3/2003 | |
| JP | 3453099 | 7/2003 | |
| JP | 2007-179955 A | 7/2007 | |
| JP | 2007179955 A | * 7/2007 | ............ H01M 4/02 |
| JP | 2008-084798 A | 4/2008 | |
| JP | 2008084798 A | * 4/2008 | ............ H01M 10/36 |
| JP | 2008-166047 A | 7/2008 | |
| JP | 2008-181870 A | 8/2008 | |
| JP | 2008-257962 A | 10/2008 | |
| JP | 2009-004139 A | 1/2009 | |
| JP | 2009-064752 A | 3/2009 | |
| JP | 2009064752 A | * 3/2009 | ............ H01M 4/02 |

OTHER PUBLICATIONS

English Translation of JP 2001273928 A.*
English Translation of JP 2007179955 A.*
English Translation of JP 2008084798 A.*
English Translation of JP 2009064752 A.*
PCT/JP2011/050346 Written Opinion dated Apr. 5, 2011.
PCT/JP2011/050346 International Search Report dated Apr. 5, 2011.

* cited by examiner

*Primary Examiner* — Patrick Ryan
*Assistant Examiner* — Kiran Quraishi
(74) *Attorney, Agent, or Firm* — Dickstein Shapiro LLP

(57) ABSTRACT

An all-solid-state secondary battery that includes a positive electrode, a negative electrode, and a solid electrolyte, and which has good moldability and favorable battery characteristics. In the all-solid-state secondary battery, a carbon material having carbon particles with a fracture strength of 100 MPa or less is used for an electrode active material.

7 Claims, 1 Drawing Sheet

14　11　13　12　15

ELECTRODE ACTIVE MATERIAL FOR ALL-SOLID-STATE SECONDARY BATTERY AND ALL-SOLID-STATE SECONDARY BATTERY USING THE SAME

CROSS REFERENCE TO RELATED APPLICATIONS

The present application is a continuation of International application No. PCT/JP2011/050346, filed Jan. 12, 2011, which claims priority to Japanese Patent Application No. 2010-016622, filed Jan. 28, 2010, the entire contents of each of which are incorporated herein by reference.

FIELD OF THE INVENTION

The present invention relates to an electrode active material for an all-solid-state secondary battery, and an all-solid-state secondary battery using the electrode active material.

BACKGROUND OF THE INVENTION

In recent years, the demand for secondary batteries as power supplies has been increased with the development of portable devices such as cellular phones and laptop computers. Above all, the development of lithium ion secondary batteries which are high in energy density has been carried out actively.

However, as lithium ion secondary batteries are used for general purposes, the issue of safety against heat generation and ignition of batteries is caused due to an increase in internal energy with an increase in the content of an active material and due to an increase in the content of an organic solvent as a combustible material for use in an electrolyte, and improvements in safety have been required.

Meanwhile, all-solid-state batteries using an inorganic solid electrolyte for an electrolyte have been attracting attention as next-generation secondary batteries. The all-solid-state batteries use, unlike existing lithium-ion secondary batteries and the like, an inorganic solid electrolyte such as incombustible ceramics and glass without using any organic solvent for the electrolyte. Therefore, the all-solid-state batteries have no worries such as ignition or liquid leakage, and have high safety.

Patent Document 1 discloses an all-solid-state lithium-based secondary battery prepared by press molding of a solid-state electrolyte, a positive electrode material, and a negative electrode material. According to Patent Document 1, disclosed is the preparation of a lithium-based secondary battery by filling a predetermined mold with the positive electrode material, the electrolyte, and the negative electrode material and pressing at a molding pressure of 3,700 kg/cm².

In addition, Patent Document 2 discloses an all-solid-state lithium secondary battery using a carbon material as an electrode active material. According to Patent Document 2, reference is made to the great importance of selecting a lithium ion-conducting solid electrolyte in the case of using graphite as an electrode active material. Disclosed is the fact that, in the case of an all-solid-state lithium secondary battery using a graphite intercalation compound as an electrode active material, the selection of the most preferable electrolyte as an electrolyte to be used allows the all-solid-state lithium secondary battery to have a higher energy density. In addition, disclosed as a preferable electrolyte is a sulfide-based lithium ion-conducting solid electrolyte mainly containing a lithium sulfide and a phosphorus sulfide and containing no transition metal, silicon, or germanium.

Patent Document 1: Japanese Patent No. 3453099
Patent Document 2: Japanese Patent Application Laid-Open No. 2003-68361

SUMMARY OF THE INVENTION

In the case of preparing an all-solid-state secondary battery by powder compaction as described in Patent Document 1, a predetermined mold is filled with electrode materials and electrolyte materials to apply press molding to the materials, and the moldability of these materials is thus of great importance. In addition, while Patent Document 2 makes reference to the importance of selecting a lithium ion-conducting solid electrolyte in an all-solid-state lithium secondary battery, the selection of not only the solid electrolyte but also the carbon material as an electrode active material also has great importance in order to achieve favorable battery characteristics. Thus, a carbon material is required which has good moldability and favorable battery characteristics in the preparation of an all-solid-state secondary battery.

Earnest research of the inventors has found that an all-solid-state secondary battery which has good moldability and favorable battery characteristics is achieved when a carbon material in which carbon particles have a fracture strength of 100 MPa or less is used as an electrode active material for the all-solid-state secondary battery.

The electrode active material for an all-solid-state secondary battery according to the present invention is characterized in that carbon particles have a fracture strength of 100 MPa or less.

The all-solid-state secondary battery according to the present invention is an all-solid-state secondary battery including a positive electrode, a negative electrode, and a solid electrolyte, and the all-solid-state secondary battery is characterized in that a carbon material in which carbon particles have a fracture strength of 100 MPa or less is used for an electrode active material.

Furthermore, it is preferable to use, for an electrode active material, a carbon material in which carbon particles have a fracture strength of 50 MPa or less.

The use of, for an electrode active material, the carbon material in which carbon particles have a fracture strength of 50 MPa or less can prepare an all-solid-state secondary battery which has better moldability and excellent output characteristics.

In the all-solid-state secondary battery according to the present invention, the solid electrolyte preferably contains at least one of a lithium-containing oxide and a lithium-containing sulfide. More preferably, the solid electrolyte is preferably sulfide glass and/or sulfide glass ceramics containing Li, P, and S. In addition, the solid electrolyte is preferably a sulfide solid electrolyte prepared from raw materials for a Li/P molar ratio of 2 to 4, for example, raw materials such as $Li_2S$ and $P_2S_5$. The use of the sulfide-based solid electrolyte makes it possible to prepare an all-solid-state secondary battery which is low in resistance between particles and excellent in pressure molding.

In the all-solid-state secondary battery according to the present invention, the positive electrode active material contained in the positive electrode is preferably a lithium-containing transition metal composite oxide or a lithium-containing transition metal composite sulfide. Above all, the positive electrode active material is preferably a lithium-containing transition metal composite sulfide typified by $Li_2FeS_2$. According to the present invention, the use of the lithium-containing transition metal composite sulfide such as $Li_2FeS_2$ for the positive electrode active material makes it possible to achieve an all-solid-state secondary battery which has good moldability, further a high capacity, and excellent rate characteristics.

The present invention makes it possible to provide an all-solid-state secondary battery which has good moldability and favorable battery characteristics.

DETAILED DESCRIPTION OF THE INVENTION

An embodiment of the invention will be described below with reference to the drawings.

Figure 1:
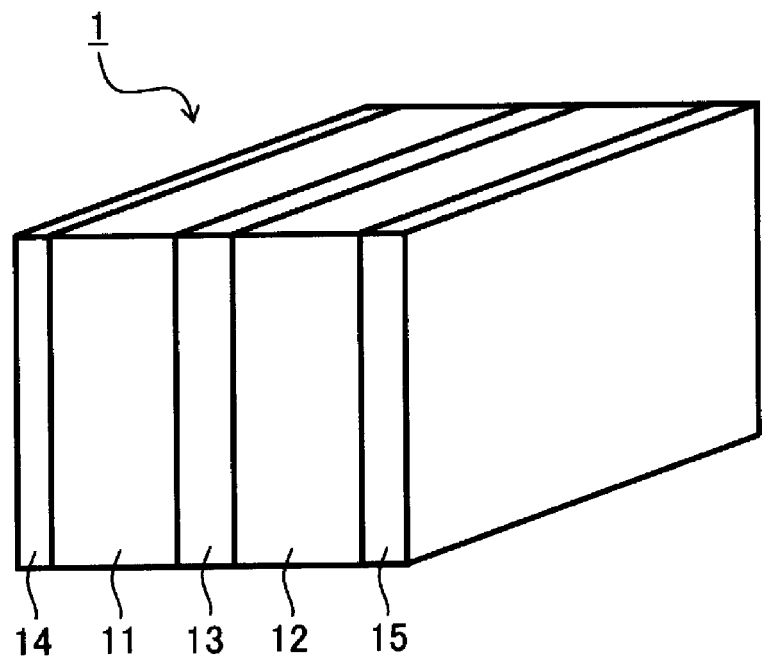
FIG. 1 is a perspective view illustrating the configuration of an all-solid-state secondary battery as an embodiment of the invention.

FIG. 1 is a perspective view illustrating the configuration of an all-solid-state secondary battery as an embodiment of the invention. As shown in FIG. 1, the all-solid-state secondary battery 1 includes a solid electrolyte 13 sandwiched between a positive electrode 11 and a negative electrode 12, includes a positive electrode current collector 14 on the outer surface of the positive electrode 11, and includes a negative electrode current collector 15 on the outer surface of the negative electrode 12.

The positive electrode 11 contains a positive electrode active material such as a Li-containing transition metal composite oxide or a Li-containing transition metal composite sulfide. Furthermore, the positive electrode 11 may contain therein a solid electrolyte containing Li, S, and P.

Examples of the positive electrode active material include Li-containing transition metal composite oxides such as $LiCoO_2$ and $LiMn_2O_4$, and Li-containing transition metal composite sulfides typified by $Li_2FeS_2$, $Li_2CuS_2$, and $Li_2NiS_2$. Above all, $Li_2FeS_2$ is preferable because of its high capacity, as compared with the other lithium-containing transition metal composite sulfides and the lithium-containing transition metal composite oxides such as $LiCoO_2$ and $LiMn_2O_4$.

The solid electrolyte 13 is not particularly limited, and can use a material composed of an inorganic compound such as a lithium-containing oxide or a lithium-containing sulfide. In particular, sulfide-based lithium ion-conducting solid electrolytes containing Li, S, and P as main constituents are known to have high ion conductivity, and the solid electrolyte 13 is thus preferably sulfide glass and/or sulfide glass ceramics containing Li, P, and S. In addition, it is preferable to use a solid electrolyte prepared from a raw material composed of a combination of $Li_2S$ and $P_2S_5$, because of its high lithium ion conductivity. Further, in addition to $Li_2S$ and $P_2S_5$, the solid electrolyte may contain LiI, $B_2S_3$, $SiS_2$, $GeS_2$, etc.

A carbon material according to the present invention is characterized in that carbon particles have a fracture strength of 100 MPa or less. The use of a carbon material in which carbon particles have a fracture strength of 100 MPa or more makes it unlikely that the carbon particles are crushed in preparing an all-solid-state secondary battery, and thus makes it difficult to prepare an all-solid-state secondary battery by powder compaction. In addition, because the carbon particles are unlikely to be crushed, the strength of electrode pellets and the filling factor are decreased to degrade the battery characteristics. On the other hand, when the carbon particles have a fracture strength of 100 MPa or less, the carbon particles are likely to be crushed, and thus easily subjected to powder compaction. Furthermore, when the carbon particles have a fracture strength of 50 MPa or less, electrode pellets can be easily prepared, and further, an all-solid-state secondary battery can be prepared which is excellent in terms of the output characteristics of the electrode.

EXAMPLES

Next, examples of the present invention will be specifically described. It is to be noted that the following examples are by way of example, and the present invention is not to be considered limited to the following examples.

[Properties of Carbon Material]

Figure 2:
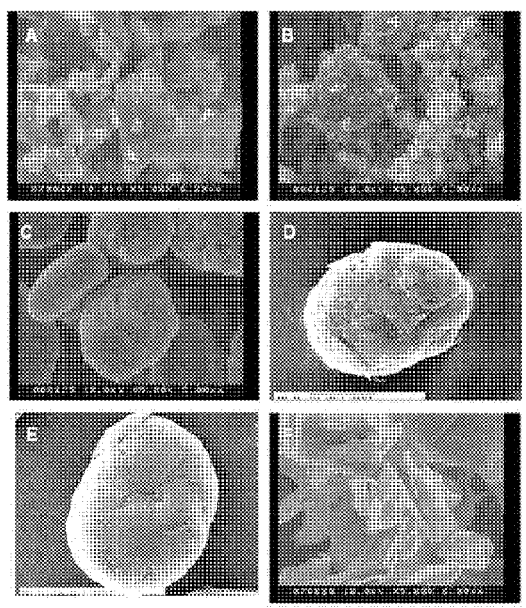
FIG. 2 is SEM images of carbon materials used in an example and a comparative example.

Table 1 and FIG. 2 show properties and SEM images of the carbon materials used in Examples 1 to 4 and Comparative Examples 1 and 2. It is to be noted that the specific surface area was measured by a BET method. In addition, the average particle size was obtained by length measurement under a metallograph.

TABLE 1

|  | Carbon Material | Specific Surface Area $cm^2/g$ | Average Particle Size μm |
|---|---|---|---|
| Comparative Example 1 | A | 4.5 | 9.1 |
| Comparative Example 2 | B | 2.3 | 10.0 |
| Example 1 | C | 3.5 | 12.5 |
| Example 2 | D | 4.3 | 22.0 |
| Example 3 | E | 7.0 | 15.0 |
| Example 4 | F | 8.1 | 8.3 |

[Measurement of Fracture Strength]

For the measurement of the fracture strength for the carbon particles of the carbon materials A to F used in Examples 1 to 4 and Comparative Examples 1 and 2, a small pressure measuring device MCT-W500 (from Shimadzu Corporation) was used. The fracture strength of the carbon particles was measured in the case of scattering a small amount of the carbon material onto a lower pressurization plate, and then applying a pressure to the carbon particles one by one with an upper pressure indenter in a planar shape of 50 μmϕ. The test conditions in this example are shown in Table 2.

TABLE 2

|  | Carbon Material | Test Force mN | Loading Rate mN/sec |
|---|---|---|---|
| Comparative Example 1 | A | 98 | 4.484 |
| Comparative Example 2 | B | 98 | 4.484 |
| Example 1 | C | 98 | 4.484 |
| Example 2 | D | 98 | 4.484 |
| Example 3 | E | 98 | 4.484 |
| Example 4 | F | 9.8 | 0.446 |

[Moldability Test]

A moldability test was carried out for the powder moldability of the carbon material. The carbon material and the solid electrolyte were mixed to obtain a mixture. The obtained mixture was put in a mold of 10 mmϕ, and subjected to pressing at a pressure of 110 MPa to prepare an electrode pellet. The mixture from which an electrode pellet was able to be prepared was regarded as molding possible, whereas the mixture from which an electrode pellet was not able to be prepared was regarded as molding impossible.

[Results of Fracture Strength and Moldability Test]

As described above, the carbon particles of the carbon materials A to F were subjected to the fracture strength and moldability test. The results are shown in Table 3. In the case of the carbon materials A and B of the carbon particles with a fracture strength of 100 MPa or more, any electrode pellets were not able to be prepared at a pressure of 110 MPa.

TABLE 3

| | Carbon Material | Fracture Strength MPa | Moldability |
|---|---|---|---|
| Comparative Example 1 | A | 299.6 | Impossible |
| Comparative Example 2 | B | 104.9 | Impossible |
| Example 1 | C | 47.0 | Possible |
| Example 2 | D | 28.4 | Possible |
| Example 3 | E | 18.8 | Possible |
| Example 4 | F | 6.7 | Possible |

Next, the carbon materials according to the present invention were used to prepare all-solid-state secondary batteries, and measurements were made for battery characteristics of the all-solid-state secondary batteries. Here are the method for preparing the all-solid-state secondary batteries and the results of measuring the battery characteristics.

[Preparation of Solid Electrolyte]

$Li_2S$ and $P_2S_5$ were weighed to have a molar ratio of 7:3, and mixed to obtain a 1 g of mixture. The mixture was subjected to a mechanical milling treatment at 25° C. and a revolution speed of 370 rpm for 20 hours in nitrogen with the use of a planetary ball mill to obtain a whitish yellow glass powder. The obtained glass powder was put in a glass airtight container, and heated at 300° C. for 2 hours to obtain a sulfide-based glass ceramic.

[Preparation of Positive Electrode Active Material]

$Li_2S$ and FeS were weighed to have a molar ratio of 1:1, and mixed to obtain a mixture. The mixture was vacuum-encapsulated in a quartz tube with an inside surface coated with carbon. Next, the quartz tube was heated at 950° C. for 5 hours to prepare $Li_2FeS_2$.

[Preparation of Electrode Mixture]

Each carbon material and the solid electrolyte were mixed at a ratio by weight of 1:1 to prepare a negative electrode mixture.

The positive electrode active material and the solid electrolyte were mixed at a ratio by weight of 1:1 to prepare a positive electrode mixture.

[Preparation of All-Solid-State Secondary Battery]

The solid electrolyte was put in a mold of 10 mmφ, and subjected to pressing to prepare a solid electrolyte layer. The positive electrode mixture was put on one side of the solid electrolyte layer, whereas the negative electrode mixture was put on the other side thereof, and pressing was then carried out at a pressure of 330 MPa to prepare an all-solid-state secondary battery pellet. The prepared all-solid-state secondary battery pellet was removed from the mold, and inserted into a stainless-steel coin case to prepare an all-solid-state secondary battery.

The all-solid-state secondary battery prepared in this example is a self-contained all-solid-state secondary battery which can be used as a battery with the mold removed, that is, with only the all-solid-state secondary battery itself.

While the all-solid-state secondary battery pellet was prepared by the pressing at a pressure of 330 MPa in this example, the pressure may be any pressure of 110 MPa or more, and preferably, it is preferable to carry out the pressing at a pressure of 150 MPa to 450 MPa.

In addition, in the case of the material resulting in collapse of the prepared all-solid-state secondary battery pellet when the all-solid-state secondary battery pellet was removed from the mold, an all-solid-state secondary battery was prepared as follows.

An all-solid-state secondary battery pellet was prepared as described above, and directly inserted into a stainless-steel coin case without removing the all-solid-state secondary battery pellet from the mold, thereby preparing an all-solid-state secondary battery.

Example 1

The carbon material C was used as an electrode active material to prepare an all-solid-state secondary battery as described above. Due to the fact that the carbon material C has carbon particles with a low fracture strength of 100 MPa or less, and also has excellent moldability, it was possible with the carbon material C to prepare a self-contained all-solid-state secondary battery.

In addition, battery characteristics of the prepared all-solid-state secondary battery were measured by the method described above. A capacity of 10 μAh was achieved by charging at 3 V, and then discharging to 1 V at a constant current of 200 μA.

Example 2

The carbon material D was used as an electrode active material to prepare an all-solid-state secondary battery as described above. Due to the fact that the carbon material D has carbon particles with a low fracture strength of 100 MPa or less, and also has excellent moldability, it was possible with the carbon material D to prepare a self-contained all-solid-state secondary battery.

In addition, battery characteristics of the prepared all-solid-state secondary battery were measured by the method described above. A capacity of 10 μAh was achieved by charging at 3 V, and then discharging to 1 V at a constant current of 200 μA.

Example 3

The carbon material E was used as an electrode active material to prepare an all-solid-state secondary battery as described above. Due to the fact that the carbon material E has carbon particles with a low fracture strength of 100 MPa or less, and also has excellent moldability, it was possible with the carbon material E to prepare a self-contained all-solid-state secondary battery.

In addition, battery characteristics of the prepared all-solid-state secondary battery were measured by the method described above. A capacity of 10 μAh was achieved by charging at 3 V, and then discharging to 1 V at a constant current of 200 μA.

Example 4

The carbon material F was used as an electrode active material to prepare an all-solid-state secondary battery as described above. Due to the fact that the carbon material F has carbon particles with a low fracture strength of 100 MPa or less, and also has excellent moldability, it was possible with the carbon material F to prepare a self-contained all-solid-state secondary battery.

In addition, battery characteristics of the prepared all-solid-state secondary battery were measured by the method described above. A capacity of 10 μAh was achieved by charging at 3 V, and then discharging to 1 V at a constant current of 200 μA.

Comparative Example 1

Due to the fact that the carbon material A has carbon particles with a high fracture strength of 100 MPa or more, the molding was impossible as a result of the moldability test.

The carbon material A was used as an electrode active material to prepare an all-solid-state secondary battery as described above. Due to the fact that the carbon material A has the carbon particles with the high fracture strength, it was impossible with the carbon material A to prepare a self-contained all-solid-state secondary battery.

Comparative Example 2

Due to the fact that the carbon material B has carbon particles with a high fracture strength of 100 MPa or more, the molding was impossible as a result of the moldability test.

The carbon material B was used as an electrode active material to prepare an all-solid-state secondary battery as described above. Due to the fact that the carbon material B has the carbon particles with the high fracture strength, it was impossible with the carbon material B to prepare a self-contained all-solid-state secondary battery.

[Comparison of Output Characteristics]

The output characteristics of the carbon materials B and C were compared with each other. The carbon materials B and C were each used as electrode active materials to prepare all-solid-state secondary batteries as described above. However, because it was impossible with the carbon material B to prepare a self-contained all-solid-state secondary battery, the battery was prepared without removing the all-solid-state secondary battery pellet from the mold as described above.

The prepared batteries were each charged at 3 V, and then discharged to 1 V at a constant current of 100 μA to find the discharged capacities. Next, the batteries were charged at 3 V, and then discharged to 1 V at a constant current of 1 mA to find the discharged capacities. The battery using the carbon material B resulted in a discharged capacity ratio (1 mA/100 μA) of 0.55. In addition, the battery using the carbon material C resulted in a discharged capacity ratio (1 mA/100 μA) of 0.75. It is determined that the output characteristics are excellent in the case of using the carbon material C in which the carbon particles have a fracture strength of 50 MPa or less.

DESCRIPTION OF REFERENCE SYMBOLS

1: all-solid-state secondary battery
11: positive electrode
12: negative electrode
13: solid electrolyte
14: positive electrode current collector
15: negative electrode current collector

The invention claimed is:

1. An electrode active material for an all-solid-state secondary battery, the electrode active material consists of a carbon material having carbon particles with a fracture strength of less than 50 MPa.

2. An all-solid-state secondary battery comprising:
a positive electrode;
a negative electrode; and
a solid electrolyte between the positive electrode and the negative electrode,
wherein at least one of the positive electrode and the negative electrode includes the electrode active material according to claim 1.

3. The all-solid-state secondary battery according to claim 2, wherein the solid electrolyte contains at least Li, S, and P.

4. The all-solid-state secondary battery according to claim 2, wherein the positive electrode comprises a lithium-containing transition metal composite oxide or a lithium-containing transition metal composite sulfide.

5. The all-solid-state secondary battery according to claim 4, wherein the lithium-containing transition metal composite sulfide is $Li_2FeS_2$.

6. The all-solid-state secondary battery according to claim 2, wherein the positive electrode, the negative electrode, and the solid electrolyte are in powder compacted form.

7. The all-solid-state secondary battery according to claim 2, further comprising:
a positive electrode current collector adjacent the positive electrode; and
a negative electrode current collector adjacent the negative electrode.

* * * * *